United States Patent [19]

Franchuk et al.

[11] Patent Number: 4,469,267

[45] Date of Patent: Sep. 4, 1984

[54] DRAW-OFF AND HOLD-BACK CABLE TENSION MACHINE

[75] Inventors: John M. Franchuk; James P. Blanchet, both of Snohomish County, Wash.

[73] Assignee: Western Gear Corporation, Everett, Wash.

[21] Appl. No.: 339,298

[22] Filed: Jan. 15, 1982

[51] Int. Cl.³ .......................................... B65H 51/10
[52] U.S. Cl. .................................................. 226/172
[58] Field of Search ............... 226/172, 171, 170, 168, 226/174, 176, 177, 186, 187, 108; 254/215, 287

[56] References Cited

U.S. PATENT DOCUMENTS

| | | | |
|---|---|---|---|
| 2,642,280 | 6/1953 | Fisk | 226/172 |
| 2,736,425 | 2/1956 | Fisk | 226/172 |
| 2,792,930 | 5/1957 | Graham | 226/172 |
| 2,797,798 | 7/1957 | Hallden | 226/172 |
| 2,981,452 | 4/1961 | Baker et al. | 226/172 X |
| 2,981,454 | 4/1961 | Dickinson et al. | 226/172 |
| 3,285,485 | 11/1966 | Slator | 226/172 |
| 3,321,925 | 5/1967 | Shaw | 226/177 X |
| 3,506,174 | 4/1970 | Shuey, Jr. | 226/177 X |
| 3,669,329 | 6/1972 | Blanchet et al. | 226/172 X |

FOREIGN PATENT DOCUMENTS

1103496 5/1955 France .............................. 226/172

Primary Examiner—Stanley N. Gilreath
Attorney, Agent, or Firm—Seed and Berry

[57] ABSTRACT

An improved cable tension machine increases the velocity for hauling in of cable from approximately 100 feet per minute to an excess of 700 feet per minute. The cable tension machine uses a floating, semirigid track suspension to hold the track belts in contact with the cable. The track suspension increases the minor variation tolerance acceptable for the cable tension machine, thereby allowing rapid running of odd shapes through the cable tension machine. A more uniform cable loading force is provided to the cable without excessive force when bodies are encountered and without jamming. Basically, the cable tension machine comprises upper and lower track assemblies positioned atop one another capable of applying a tensioning force to the cable which passes between the track assemblies. A housing holds both track assemblies in spaced relationship, allowing movement of the upper track assembly relative to the lower track assembly through a pivotable lift point on the upper part of the housing. The lift point is located to optimize performance. The housing is open on one side to allow threading of a cable between the track belt.

27 Claims, 10 Drawing Figures

DRAW-OFF AND HOLD-BACK CABLE TENSION MACHINE

DESCRIPTION

1. Technical Field

The present invention relates to an improved cable tension machine which includes floating, semirigid track suspensions for the track belts and which positions the pivotable lift point for the upper track assembly to optimize performance. The cable tension machine is particularly useful for paying out or hauling in submarine communication cable during repairing or deploying of the cable.

2. Background Art

The tasks of repairing or deploying submarine communication cable are expensive and difficult ones, limited by the rate at which the communication cable may be hauled. The modern communication cables place constraints on the machinery, especially with respect to point squeeze, and require advances in the art to protect the delicate communication lines shielded within the cable.

Ordinarily, the cable tension machine will have fixed suspensions for the track belts on both an upper and lower track assembly. The track belts squeeze the cable to provide conveying tension for the cable. These devices are limited in a number of ways. Particularly, they are able to accept only a small tolerance in the variance of the size of the cable (less than one inch) because the suspensions are rigid, and, therefore, jam when they encounter large objects such as shackles, chains, armor wire, chokers, grapnels, anchors, splices, or any other bodies connected with communications cables. To accept larger bodies, the upper track must be lifted upwardly away from the lower (an act which will not readily occur with a "step" increase in cable dimension). Even if the object encountered meets the small tolerance limitations of the fixed-suspension devices, often the body will jam the cable tension machine because of its odd shape. That is, the "step" in dimension will jam the first roller of the suspension against the second roller, greatly increasing the machine's frictional losses. Even when jamming is not a problem, the machine may be inadequate because it will provide a nonuniform cable tensioning force across the body, thereby damaging the body or applying an excessive point squeeze on the cable, and will often provide an inadequate tensioning force.

To improve a fixed-suspension cable tension machine, compensators (pneumatic cylinders) are placed between the upper and lower frames to allow the upper frame to move relative to the lower, thereby allowing the machine to better accept objects of differing shapes. Nonuniform cable loading still is a constant problem, however. Compensators improve the fixed-suspension cable tension machine, but are inadequate in comparison to the possible improvements.

Another improvement is to use a flexible steel plate suspension on an air balloon. Unfortunately, the flexible steel plate suspension does not greatly increase the tolerance of the machine to accommodate bodies of different shape and does not have fixed roller spacing. Upon swallowing odd shapes, the rollers of the flexible steel plate suspension can interfere with one another, causing a jam.

A non-track approach is a pneumatic tire cable tension machine that usually has a fixed lower tire upon which an upper tire is aligned. Pressure input means, such as a hydraulic or pneumatic cylinder on a pivotable fork connecting arm, impart a downward pressure upon the upper tire. Because the cable contact surface with this pneumatic tire machine is rather small, the amount of tension attainable by the machine is limited. In some cases, a number of these tire machines are arranged in series, thereby achieving the desired tensioning. The squeeze force is different for travel of the cable in opposite directions.

The prior art presents numerous problems to efficient hauling and tensioning of submarine communication cable. To operate optimally, a machie needs to have a better swallow capability whereby the machine is able to accept abrupt corners without jamming and to accommodate larger sized objects and greater changes while still maintaining a substantially uniform cable squeeze pressure regardless of tensioning level or direction of travel. It is important that a uniform cable squeeze pressure be applied so that faster cable hauling velocities may be obtained without damage to the cable and without slipping of the cable within the machine.

DISCLOSURE OF INVENTION

The present invention relates to an improved cable tension machine to draw off and hold back cable (such as submarine communication cable) during deployment or repair. In particular, a novel feature of the invention is a floating, semirigid suspension for the track belt on each track assembly. The optimal cable tension machine is able to provide a substantially uniform cable loading force irrespective of the shape of objects which pass between the track belts and is able to pass odd shapes without jamming and without exerting excessive cable loading force upon the odd shapes or cable. Because it is common when handling submarine communication cable to encounter shackles, chains, armor wire, chokers, grapnels, anchors, splices, or other handling tackle, it is important that the cable tensioning machine be able to accept odd shapes with as great a tolerance as possible. The improved draw-off and hold-back cable tension machine of this invention can accommodate minor variations of up to six inches by having a floating, semirigid suspension in each track assembly, and is able to accommodate gross variations of up to an additional twelve inches by raising the upper track assembly inwardly above the lower track assembly.

Another novel feature involves placing the pivotable lift point for the upper track assembly substantially at the upper surface (one radius above the centerline) of the nominal cable to be hauled. Placing the pivotable lift point at this point minimizes the torque created by longitudinal cable tensioning forces because the moment arm between the surface of the cable (the longitudinal axis of the input force) and the pivot axis is minimized. Therefore, the upper track assembly will gain added stability to oppose longitudinally imposed forces. Also, placing the lift point substantially near the centerline of the cable axis mazimizes the torque created by vertical forces which seek to raise the upper track assembly. In this way, the track assembly will tend to swing upwardly as easily as possible to accept an enlarged body, maximizing the swallow capability of the machine. Longitudinal cable tensioning forces impart nonuniform cable squeeze forces unless countered. Placing the lift point in this location is particularly desirable and advantageous when the upper track assembly is balanced (as is ordinarily required if both suspensions float).

It is important to maintain a uniform squeeze force which is substantially independent of the tension placed on the cable by the machine. Also, odd-shaped bodies will often be encountered, and it is important that the machine be able to pass these bodies while maintaining as uniform a cable squeeze force as possible. Otherwise, the hauling operation is greatly slowed, because the machine must be threaded and unthreaded. Finally, the optimal machine applies a uniform cable loading force independent of the direction of travel of the cable.

More uniform squeeze forces are better achieved by placing the lift point so that the axis of rotation of the upper track assembly defines a line which bisects the cable contact surface. In this position, the lift point will allow input squeeze forces to be evenly distributed over the cable contact surface, while other positioning would introduce nonuniform forces to the track assemblies.

In its most general concept, the cable tension machine of this invention is able to haul in cable or to pay out cable with (1) upper and lower track assemblies, positioned atop one another, which are capable of applying a tensioning force to the cable which passes betweem track belts, (2) a housing to hold both track assemblies in spaced relationship, allowing movement of the upper track assembly relative to the lower track assembly through a pivotable lift point on an upper frame of the housing and allowing the cable to be threaded between the track belts from one side of the machine, and (3) a loading device acting through the lift point to allow automatic compensation between the track assemblies for gross variations in cable dimensions and to allow input of a predetermined squeeze force upon the cable. Each track assembly preferably has a track frame to which an endless track belt is mounted. The track belts contact the cable in the conventional manner to move the cable. The cable contact surface between the track belts of the upper and lower track assemblies is defined by a track belt suspension which is semirigidly attached within the frame of each track; thereby, each track belt suspension is capable of accepting minor variations in the cable dimensions (up to as much as three inches) as it floats within the track frame.

In operation, the cable is threaded between the track belts of the cable tension machine and is held between the track assemblies by squeeze pressure exerted by the track belt suspension and loading device. To ensure that the cable remains relatively in the center of the lower track belt, a cable centralizing means preferably is associated with the lower track assembly.

The floating, semirigid track belt suspension, which vastly improves the performance characteristics of this machine, preferably comprises a plurality of roller sets wherein each roller set has a predetermined equal spacing between adjacent rollers. The roller sets are held apart by rigid connecting links rigidly attached to both ends of the roller shafts on the end adjacent rollers of neighboring sets. These rigid connecting links form a closed quadrilateral to provide torsional rigidity for the suspension and limit fore and aft pivotal movement of the rollers. Bushing roller supports link the rollers within each roller set to allow free rotation of the roller shafts to which they are attached and to allow pivoting of sets of rollers relative to one another. The bushing roller supports thereby allow the semirigid, elongated suspension body formed by the rollers to articulate when various shapes pass between the rollers and yet allow application of a substantially constant cable squeeze force to whatever shape passes between the track belts.

Twelve rollers are commonly used to form the track belt suspension of a preferred cable tension machine. First, the twelve rollers are paired into six groups of two rollers connected with bushing roller supports. The six groups are connected with five sets of connecting links. The bushing roller supports are grouped into three sets of two, and each of the three sets is connected to a separate suspension plate. A suspension air spring connects each suspension plate to the frame. The air springs allow each track suspension to float within end-of-travel stops as much as three inches apart, thereby providing a six-inch tolerance swallow capacity for the machine from the floating suspensions. If only one suspension floats, the swallow capacity is one-half, of course. At approximately 125 psi maximum air loading through the air springs, a cable loading force of approximately 200 pounds per linear inch may be imparted to the cable. The loading force is not limiting, however (except as dictated by the cable to be hauled in or paid out). Pneumatic springs are used to provide the fast time response of pneumatic systems and a large air volume (and subsequent pressure) substantially independent of the displacements encountered by the floating suspensions. Hydraulic springs or elastomeric or metallic springs may be used (however, a higher loading occurs when a metallic spring has a higher displacement). Air springs are preferred because they develop a more uniform vertical force between two surfaces but are otherwise free in all axes. Thus, the air springs allow the track suspension to float and to move relatively freely. To position the track suspensions initially and to limit the length of travel, centering arms and end-of-travel stops are placed on the frame. The upper track assembly is balanced so that it rests substantially horizontally and so that the air springs of the upper and lower track assemblies are fully extended against the end-of-travel stops. A balanced track assembly has the best operating characteristics for encountering objects, because the air springs have maximum capacity to react to input forces and are essentially isolated to respond only to forces created by the cable.

To prepare the suspension for odd-shaped bodies, arcuate end roller arms are provided. These arms provide a curvature for the track belt, share input loads, and preload the first roller of the suspension when an odd-shaped body is encountered by moving the suspension's lead roller to anticipate the body. Centering arms anchor the suspension to the frame of the track to transfer longitudinal loads from the suspension to the frame. Torsion arms transfer torsional forces from the suspension to the frame.

A balanced pneumatic tire concept with the novel pivot feature may also be used. In this embodiment, a plurality of pneumatic tires are mounted on a housing to abut fixed pneumatic tires on a lower track. The upper frame is balanced so that it freely floats above the lower frame with matched centers of effort, thereby enhancing uniformity of cable loading pressure regardless of the direction of travel or the tensioning force. Earlier devices using pneumatic tires have not recognized the tremendous improvement in performance obtained by balancing the upper frame nor have they placed the pivotable lift point in its optimal location.

A balanced cable tension machine of this invention can operate at a velocity of at least 700 feet per minute, far in excess of earlier devices, and can apply a substantially constant cable tensioning force for hauling in either direction.

To further enhance performance of the cable tension machine of this invention, it is possible to incorporate shock mitigating devices coupling the upper track to a fixed ground. These shock mitigating devices smooth the operation of the floating upper track assembly and reduce wear upon the machine.

These and other novel features, advantages, and objects will be apparent from the drawings, description, and claims of this application.

BEST MODE FOR CARRYING OUT THE INVENTION

A common cable tension machine grips a cable between two track belts. Powered track belts are driven to haul in and to tension a cable which is squeezed between the track belts. The preferred cable tensioning machine of this invention uses a novel, floating, semirigid track suspension to apply a substantially uniform cable loading force to the cable regardless of the variation in dimensions of the object between the tracks. Also, the machine optimally positions the pivotable lift point to enhance performance. Nonuniformities of pressure occur in other machines when couplings, knots, shackles, cable bodies, chains, armor wire, chokers, grapnels, splices, or other bodies pass between the track belts. The substantially uniform cable squeeze force created with this preferred machine is independent of the cable dimensions, thereby allowing passage of bodies without jamming, without crushing the bodies, or without resulting in excessive point squeeze pressure on the cable.

Before describing the preferred embodiments of this invention with respect to the drawings, several definitions will be provided. In the drawings, reference axes are provided to ease understanding of the invention. In these drawings, the X axis will be designated the longitudinal axis; the Y axis will be designated the transverse axis; and the Z axis will be designated the vertical axis. A cable contact surface is defined by the contact of the track belt of the upper track with the track belt of the lower track and is generally a substantially planar surface in the X-Y plane. Longitudinal forces are forces imposed upon the track in the direction of the longitudinal axis. Torsional forces are forces imposed upon the track which tend to rock the track belt suspension in the Y-Z plane. The semirigidly attached track belt suspension of this invention is able to accommodate minor variations in cable dimensions. By this, it is meant that the floating nature of the semirigid track suspension is able to move in the vertical direction over about a three-inch range. Thus, a minor variation of six inches can be swallowed if both the upper and lower track belts float. Gross variations are automatically accommodated by the upper track because it rises above the lower track when a predetermined upward threshold pressure on the track is exceeded. Up to twelve inches of gross variation are possible with the cable tensioning machine of this invention (limited only by the cylinder rod length of a pneumatic cylinder which allows the movement).

Figure 1:
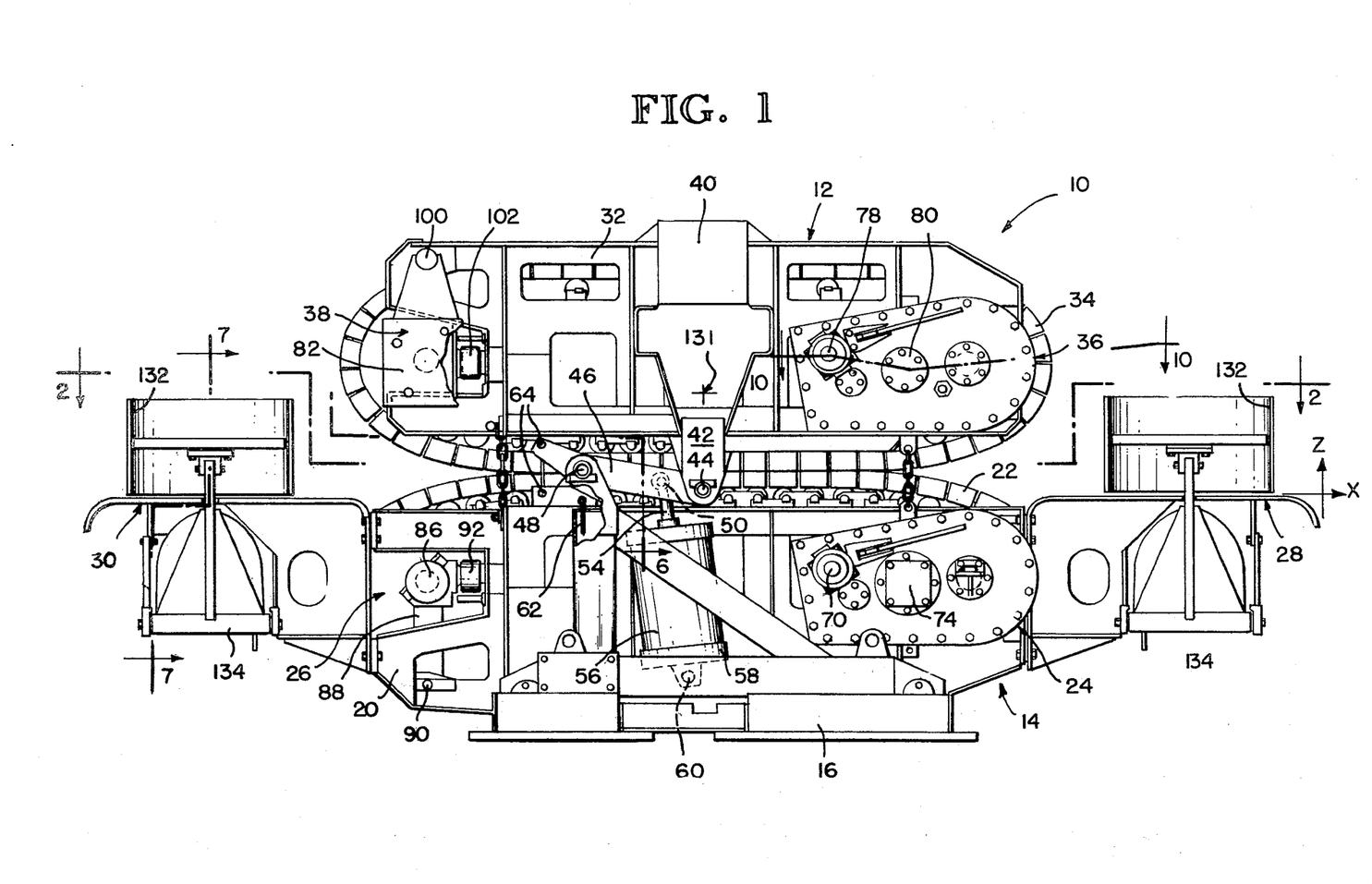
FIG. 1 is a side elevation of a preferred cable tensioning machine of this invention.
Figure 2:
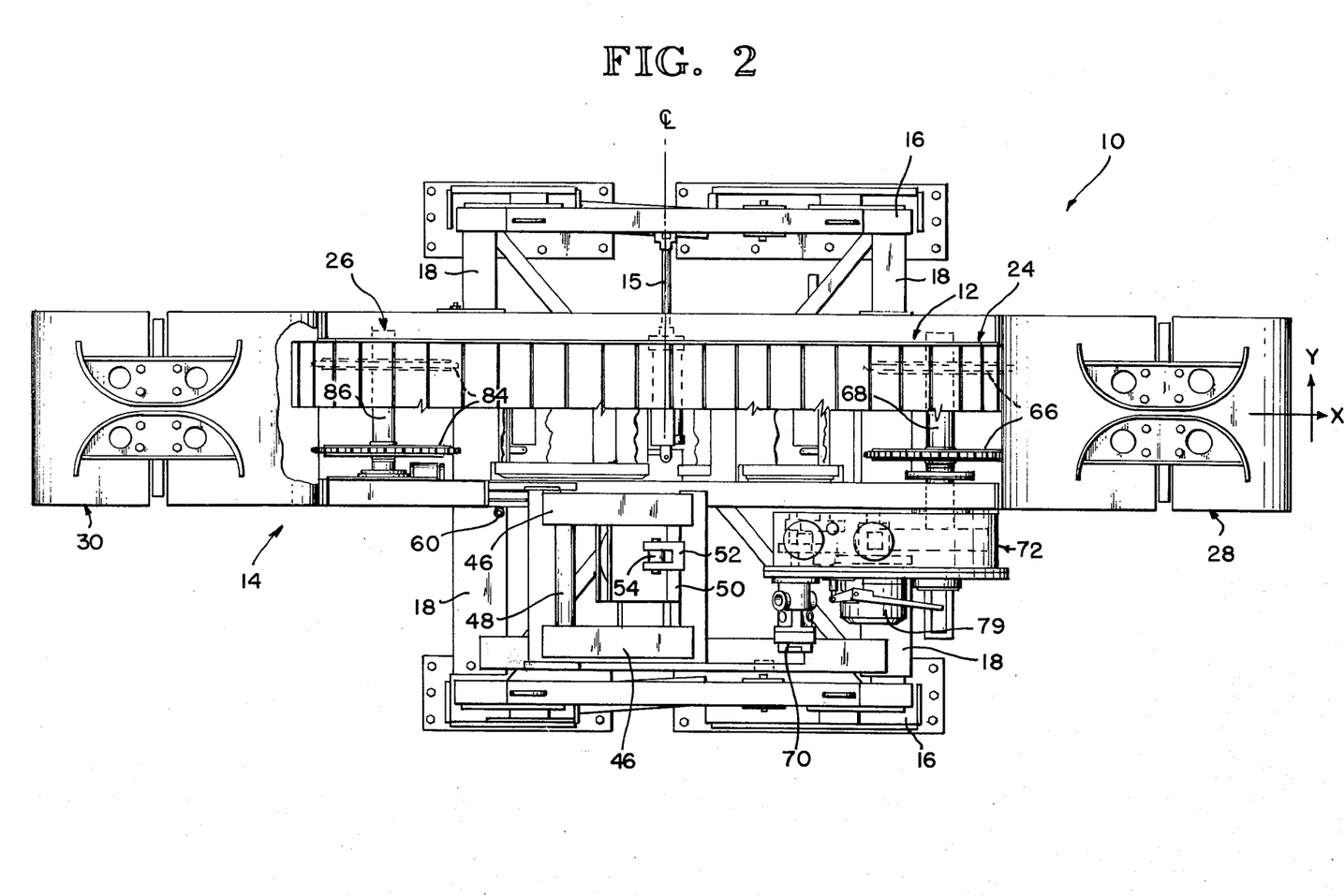
FIG. 2 is a sectional view of the cable tension machine of FIG. 1, taken along line 2—2 of FIG. 1.

Now referring to the drawings, in FIG. 1, a cable tension machine 10 of this invention has an upper track assembly 12 and lower track assembly 14 positioned atop one another in spaced relationship. The lower track assembly 14 is mounted on a base 16 which allows positioning of the lower track assembly 14 in a plurality of planes defined by the longitudinal and vertical axes. As best shown in FIG. 2, the base 16 is secured to the deck of the ship (not shown) and includes slide bars 18 to allow sliding of the lower track assembly 14 transversely through suitable hydraulic means 15.

Figure 7:
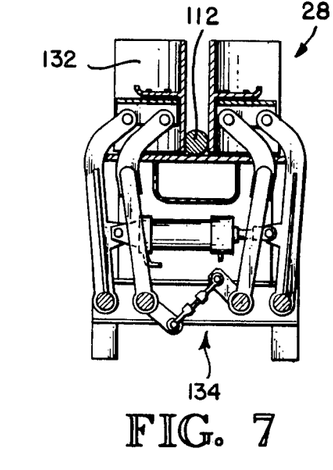
FIG. 7 is a detail of a four-bar linkage of a cable centralizing means of this invention.

The lower track assembly 14 has a frame 20 which defines the generally oval shape of the track belt 22 which encircles the frame 20 and is revolvable around the frame 20 by a drive sprocket assembly 24 and an idler sprocket assembly 26, which will be described in more detail later in this description. At each end of the lower track assembly 14, cable centralizing guides 28 and 30 on four-bar linkages (as shown in FIG. 7) help maintain the position of the cable centrally within the track belt 22 of the lower track assembly 14.

The upper track assembly 12 is analogous to the lower track assembly 14 in that the upper track assembly 12 has a frame 32 and an endless track belt 34. As with the lower track assembly 14, the track belt 34 of the upper track assembly 12 rotates around the frame 32 by a drive sprocket assembly 36 and an idler sprocket assembly 38.

Figure 6:
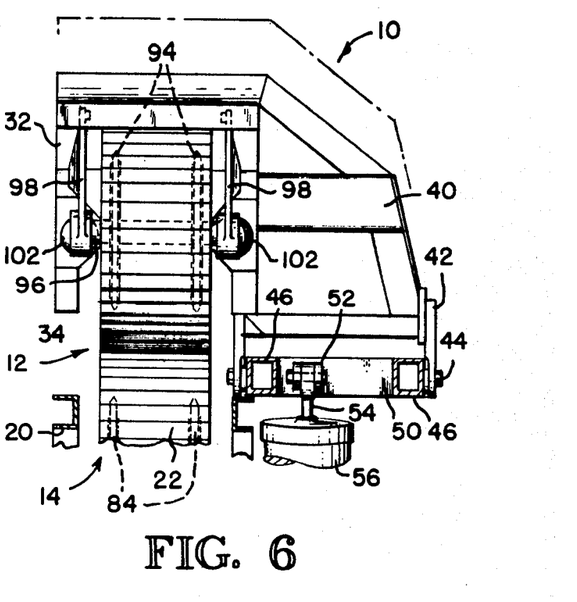
FIG. 6 is a partial front elevational view of the preferred cable tension machine of this invention, taken in the direction of line 6—6 as shown in FIG. 1.

As best shown in FIG. 6, a housing 40 interconnects the upper track assembly 12 in cantilevered fashion over the lower track assembly 14 and allows raising of the upper track assembly 12 with respect to the lower track assembly 14. The housing 40 connects to the frame 32 of the upper track assembly 12 with cantilevered beams to allow open access to the cable contact surface along one side of the cable tension machine 10. An ear 42 is incorporated into the housing 40 to provide a pivotable lift point 44 positioned substantially at the center of the nominal cable (not shown in FIGS. 1 or 2) which passes between the track belts 32 and 34 of the upper and lower track assemblies 12 and 14. Two connecting arms 46 are pivotally connected to the lift point 44 and are free to rotate around shaft 48, which is rigidly fixed to the lower frame 20. A shaft 50 connects the connecting arms 46 near the lift point 44 to a coupling 52 which, in turn, connects with the cylinder rod 54 of a pneumatic cylinder 56. The pneumatic cylinder 56 is pivotally connected through a coupling 58 on shaft 60 to the base 16. Thus, to lift the upper track assembly 12 relative to the lower track assembly 14, as is required when threading the machine, the cylinder rod 54 of the pneumatic cylinder 56 is extended to push the connecting arms 46 upwardly around the shaft 48, thereby moving the upper track assembly 12 upwardly. During operation, the upper track assembly 12 may rise if the vertical lifting force exceeds the threshold resistance of the cylinder 56. Preferably, the cable tension machine 10 is able to achieve gross variations of up to twelve inches in spacing of the upper track assembly 12 relative to the lower track assembly 14.

The pneumatic cylinder 56 is also useful for applying a predetermined squeeze force to the cable which passes between the track assemblies 12 and 14. Once a cable has been threaded between the track belts 22 and 34, the cylinder rod 54 of the pneumatic cylinder 56 may be retracted to bring the upper track assembly 12 securely into contact with the cable over the cable contact surface.

A pin 62 is positionable in a slot on the frame 20 to allow locking of the upper track 12 in its raised position by inserting the pin 62 into aligned holes 64 when the cylinder rod 54 of pneumatic cylinder 56 is fully raised. When pinned, the upper track assembly 12 is unable to lower even if the pneumatic pressure should fail.

As best shown in FIG. 2, the drive sprocket assembly 24 for the lower track assembly 14 preferably includes two spaced drive sprockets 66 affixed to a common shaft 68. A hydraulic motor 70 drives shaft 68 through a gear reduction drive train 72 (see analogous details in FIG. 10) to power the lower track belt 22. A brake 74 is coupled directly to the gear reduction drive train 72.

Figure 10:
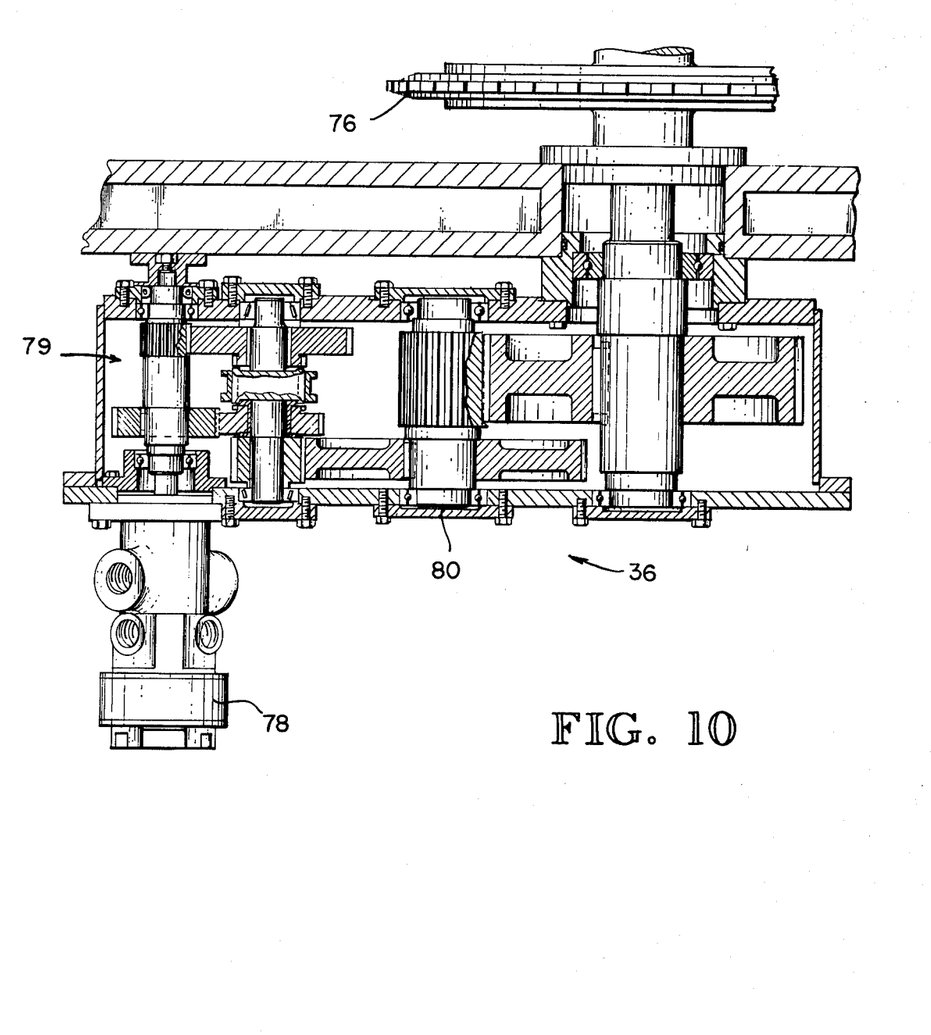
FIG. 10 is a sectional view of a preferred gear reduction box used to power the track belts of a cable tension machine of this invention, taken along line 10—10 of FIG. 1.

On the upper track assembly 12, the drive sprocket assembly 36 is analogous to that of the lower track assembly 14. Two drive sprockets 76 (FIGS. 3 and 6) are positioned on a common shaft (not shown) and are driven by a hydraulic motor 78 (FIG. 1) through a suitable gear reduction drive train 79 (FIG. 10). A cover 80 is positioned where the brake 74 is positioned on the lower drive sprocket assembly 24. On the upper track assembly 12, the brake 82 is positioned on the idler sprocket assembly 38 to better balance the upper track assembly 12, as will be explained in greater detail later in this description.

As best shown in FIG. 2, the idler sprocket assembly 26 of the lower track assembly 14 consists of two spaced idler sprockets 84 on a common shaft 86. The shaft 86 is connected near its ends to connecting arms 88 which extend downwardly to provide pivotable connections to the frame 20 through shafts 90. Air springs 92 bias the shaft 86 outwardly to maintain tension in the track belt 22.

The idler sprocket assembly 38 of the upper track assembly 12 is analogous to the lower track assembly 14 in that two spaced idler sprockets 94 (FIG. 3) are mounted for rotation on a common shaft 96. Connecting arms 98 are attached to the shaft 96 and are pivotally mounted with shafts 100 to the frame 32 of the upper track assembly 12. Air springs 102 (FIG. 6) bias the sprockets 94 outwardly to maintain tension in the track belt 34 of the upper track assembly 12.

Figures 3, 4:
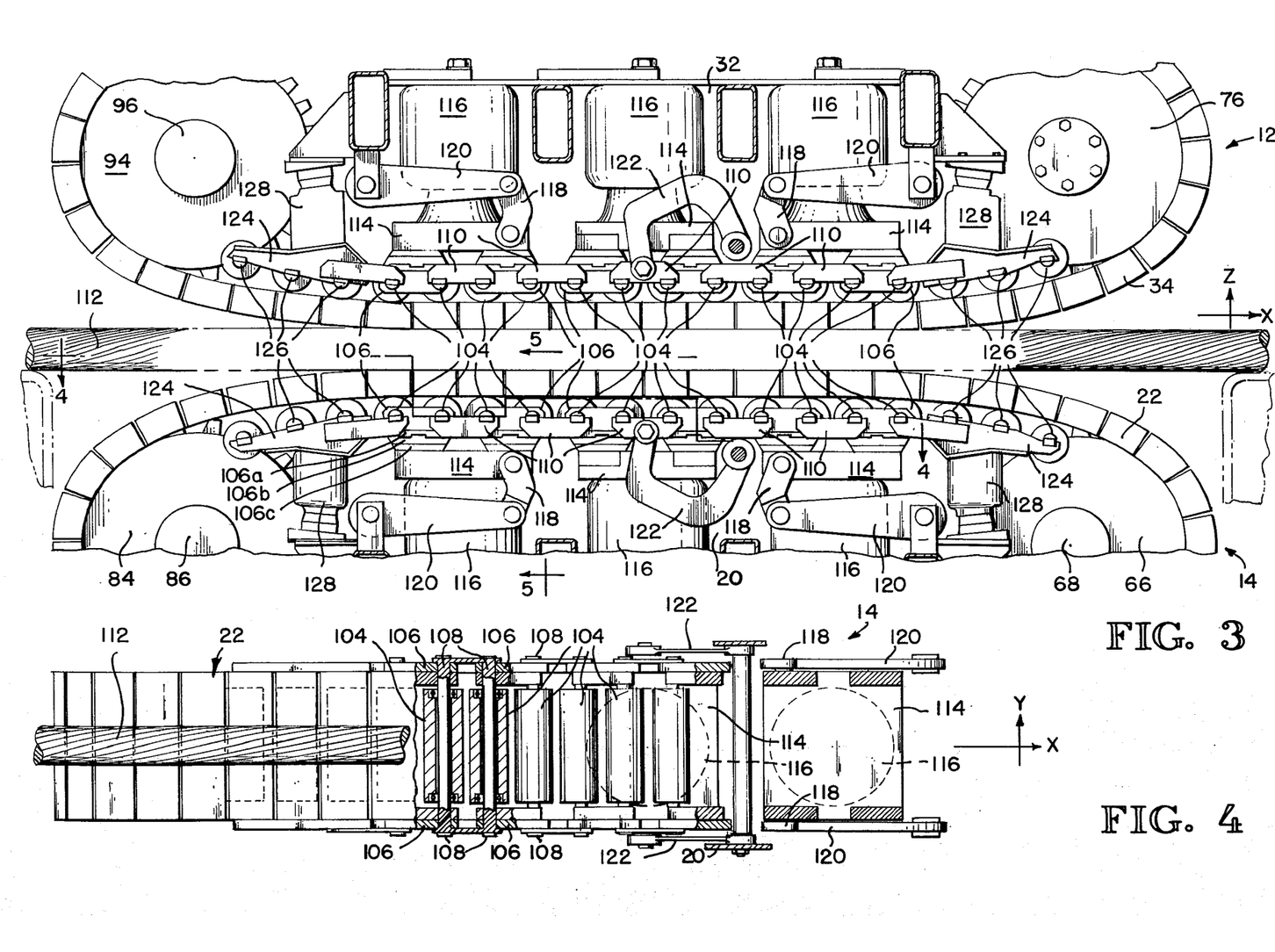
FIG. 3 is a detail of the preferred track belt suspension of this invention.
FIG. 4 is a plan view taken along line 4—4 of FIG. 3.

A novel, floating, semirigid track suspension of this invention is best illustrated in FIG. 3. Because the track suspension is common for the upper track assembly 12 and lower track assembly 14, common numbers will be applied to common parts in either track assembly 12 or 14.

Preferably, twelve rollers 104 are used in each track suspension. Pairs of rollers 104 are coupled together by bushing roller supports 106 to form six roller pairs. The bushing roller supports 106 have bushings which allow the shafts 108 of the rollers 104 to rotate freely. Between roller pairs, a rigid connecting link 110 rigidly connects the shaft 108 of one roller 104 in one roller pair with the shaft 108 of another roller 104 in an adjacent roller pair. The alternating bushing roller supports 106 and rigid connecting links 110 provide a semirigid, elongated suspension unit of twelve rollers 104. "Semirigid" is used to mean that the suspension unit is essentially planar. However, when an odd-shaped part of the cable 112 passes between the track belts 22 and 34, the forces imparted by the odd shape allow the track suspension to articulate about the bushing roller supports while maintaining a substantially fixed distance between rollers. Roller interference is eliminated. The rigid connecting links 110 also provide improved torsional rigidity for the suspension. "Semirigid" also means (as will be more completely described) that the suspension unit is able to move over a limited distance in the vertical direction to accept bodies between the track assemblies. That is, the suspension unit floats in the vertical direction on air springs.

Each bushing roller support 106 consists of three pieces: a yoke roller section 106a (which rotatably connects with the shafts 108 of the rollers 104), a reinforced elastomeric section 106b of cast polyurethane elastomer (which allows limited vertical and shear movement), and a connecting plate portion 106c for interconnecting the entire bushing roller support 106 to suspension plates 114 and, ultimately, to the frame 20 or 32 of the track 14 or 12. While rubber, synthetic rubber (such as Neoprene), steel spring towers, or other suitable springs may be used to accommodate vertical and shear forces in the bushing roller supports 106, bonded polyurethane elastomers are preferred, especially those having a durometer hardness of between 55 and 80±10. The elastomeric hardness of vertically adjacent bushing roller supports 106 on the upper and lower track assemblies 12 and 14 are of similar hardness so that there is better torsional load sharing between the upper and lower track assemblies 12 and 14 and so that the squeeze force is equally applied by both track assemblies.

Pairs of bushing roller supports 106 are connected to suspension plates 114, which, in turn, are connected to air springs 116 mounted on the frames. The air springs 116 exert a force in the vertical direction upon the suspension plates 114, and the plates transfer the force to the bushing roller supports 106 to bias the rollers 104 outwardly against the track belts 22 or 34. On each track assembly, the air springs 116 are pneumatically interconnected. End-of-travel stops 130 (FIG. 5) limit the vertical movement. Matching the forces exerted by the air springs 116, while compensating for the effect of gravity in the air springs 116 of the upper track assembly 12, allows a uniform squeeze force to be applied along the elongated suspension unit of the track suspension and, consequently, a uniform force upon a body between the track assemblies. The elastomeric layer 106b of the bushing roller supports 106, together with the air springs 116, place the track suspension in a floating condition where a nonuniform vertical force can move the semirigid track suspension upwardly or downwardly. Floating helps the machine to apply a substantially uniform force, independent of the shape of the object between the track belts 22 and 34, and allows greater vertical displacement of the suspension without jamming of the cable tension machine.

Additional torsional rigidity is provided for the semirigid track suspension through connecting links 118 connected to opposite transverse sides of the outer suspension plates 114, which, in turn, are connected to torsion arms 120 mounted on the opposite sides of the respective frames. Longitudinal forces exerted on the track suspension are transmitted to the frame by transversely spaced centering arms 122, which are interconnected between the central rigid connecting link 110 of the track suspension and the frame.

Arcuate end roller arms 124 are pivotably connected at the ends of each main track suspension unit. The arcuate end roller arms 124 provided converging or diverging direction for the track belts 22 or 34 at the inlet or outlet of the cable contact surface. The arcuate shape of the end roller arms 124 is beneficial when encountering "step" function cable dimension changes which otherwise would impart a large force upon the first roller 104 of the track suspension. With the end roller arms 124, the track belts 22 and 34 are positioned in a manner which allows acceptance of larger cable dimensions and which shares the load with the first roller 104 of the suspension by imparting an anticipatory movement and load upon the first roller 104 of the suspension, even though the arms 124 may articulate with respect to the suspension. Air springs 128 limit the movement of the end roller arms 124 and bias them outwardly by a predetermined force.

The track belts 22 and 34 of this invention are conventional, consisting of an endless belt of alternating track pads and track connecting links (FIG. 4). The track pads conventionally have sprocket engaging interfit surfaces fitted into their inner surfaces.

Figure 5:
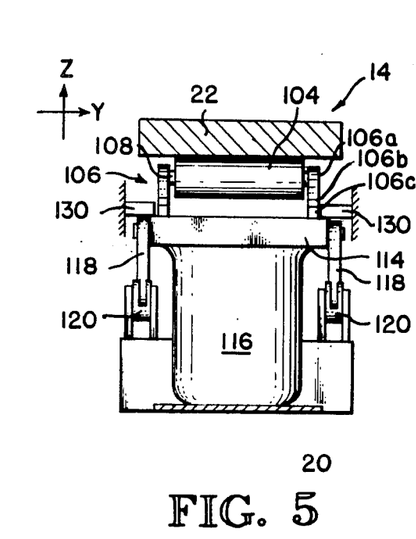
FIG. 5 is a schematic sectional view as though taken along line 5—5 of FIG. 3.

As shown schematically in FIG. 5, end-of-travel stops 130 are positioned on the lower frame 20 to abut against the suspension plate 114 to check movement of the suspension plate when forced vertically by the air spring 116. For the upper track asssembly 12, the structure is analogous.

Because the air springs which support the floating suspensions are free to move, an unbalanced system will cause some of the air springs 116 to be compressed, while others will be stretched. When the center of gravity is not over the lift point 44, the machine will have a suspension unit which is stiff to rotational forces in one sense, while soft to rotational forces in the opposite sense. In the stiff case, the upper track assembly 12 will tend to raise above the lower track assembly 14 rather than to have the suspension unit absorb the anomaly. This type of machine 10 will be able to quickly swallow large objects which cause torques in its soft rotational sense, but will more slowly swallow objects which cause torques in the stiff rotational sense. More uniform cable squeeze is provided through balancing regardless of the shape of the body or the direction of cable travel. That is, loading of the cable 112 is not altered by the configuration that the suspension unit of the upper track assembly 12 assumes relative to the lower track assembly 14. The ability to have a substantially uniform squeeze leads to a great increase in the speed capability for the machine.

To balance the upper track assembly 12 requires placing the center of gravity 131 (FIG. 1) in a vertical transverse plane which also includes the lift point 44. The lift point 44 is also placed substantially at the upper surface of the cable 112, as will be explained. That is, the lift point 44 is placed on a plane defined by the lower surface of the track belt 34 of the upper track assembly 12 when the track belt 34 is in its fully extended position.

If the center of gravity is located in a transverse (Y-Z) plane above the lift point 44, the upper track assembly 12 will assume a substantially horizontal configuration about the lift point 44, with the suspension being essentially in the X-Y plane. The forces of the suspension and gravity will work essentially in the vertical direction and the suspension unit will ordinarily be biased against the end-of-travel stops 130.

With the lift point 44 located substantially at the upper surface of the cable 112 tensioned in the machine 10, the upper track assembly 12 will be optimally positioned to accept odd-shaped bodies. The moment arm for torques from longitudinally directed forces will be nearly minimized and the upper track assembly 12 will remain reasonably stable to imposed longitudinal forces. Longitudinal forces ordinarily are imposed as a result of cable tensioning by the drive sprockets. The moment arm for torques from vertically directed, nonuniform forces will be nearly maximized with the lift point 44 positioned at the centerline of the cable 112. Thus, with a large body, the maximum torque from a vertical force will be applied through the pivotable lift point 44 and the upper track assembly 12 will have the maximum swallow capacity. As easily as possible, the upper track assembly 12 will revolve about the lift point 44 to accept the odd-shaped body. To further ease movement, the upper track assembly 12 is made as light as is reasonably possible.

In a preferred machine 10 of this invention, the lift point 44 is set, as a compromise, substantially at the centerline of the nominal cable to be hauled. The machine 10 hauls cables of varying diameter and encounters bodies of various shapes. With the lift point 44 at the nominal centerline, the best overall performance for the various circumstances encountered is obtained. As adjustable lift point might be used to retain optimal perfomance.

With the lift point 44 below the upper surface of the cable, the machine 10 retains essentially the uniform squeeze and has increased swallow capability. Imposed longitudinal forces generate torques during hold-back conditions, which aid the upper track assembly 12 to accept the body. Although placing the lift point 44 below the upper surface is an improvement and is a part of the invention, being below is not optimal for all functions. Therefore, this application should be interpreted to encompass all machines which achieve substantially the results described on substantially the same principles. That is, "substantially at the upper surface" should be given broad interpretation to mean at or below the upper surface, within the functioning of the machine.

More uniform squeeze forces are also better achieved by placing the lift point so that the axis of rotation of the upper track assembly 12 defines a line which bisects the cable contact surface. In this position, the lift point will allow input squeeze forces to be evenly distributed over the cable contact surface while other positioning would introduce nonuniform forces to the track assemblies.

Balancing the upper track assembly 12 and properly positioning the lift point 44 allows matching of the cable squeeze force exerted by the upper or lower track assemblies 12 and 14 and matches the center of effort for the track pads. With a substantially uniform squeeze force, the machine 10 is less susceptible to damaging cable when it encounters odd-shaped bodies. Also, the machine is less susceptible to slippage of the cable because a substantially uniform force is ordinarily applied to the entire contact surface area.

It has been found that adjusting the center of gravity to balance the upper track assembly 12 is accomplished by moving the brake 82 from its mounting on the drive sprocket assembly 34 to place it on the idler sprocket assembly 38 (as shown in FIG. 1). Balancing the upper track assembly has allowed the machine to increase in speed from approximately 150 feet per minute to over 700 feet per minute.

Preferred means for centralizing the cable 112 on the lower track belt 22 are illustrated in FIG. 7. Drag boards 132 are held in position by a conventional four-bar linkages 134.

Figure 8:
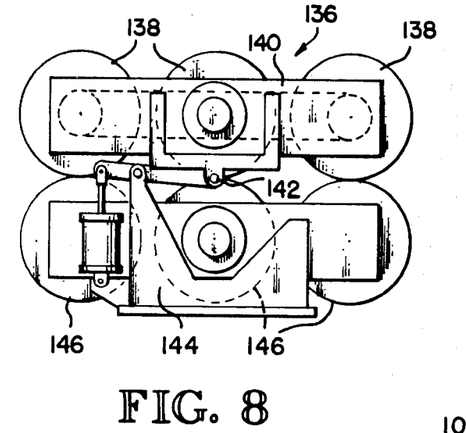
FIG. 8 is a schematic view of a pneumatic tire device according to this invention.

The balanced upper track assembly concept and location of the lift point is applicable also to pneumatic tire embodiments of this invention. As illustrated in FIG. 8, the upper frame 136 comprises multiple pneumatic tires (three, in this case) 138 mounted to a connecting arm 140 and balanced about the optimal lift point 142 (i.e. at a point on a horizontal axis in the transverse vertical plane which passes through the center of gravity of the upper track, as in the first embodiment). The lower frame 144 has analogous, matching pneumatic tires 146 attached to a connecting arm 147. Minor variations in swallow capacity for the cable tension machine of the pneumatic tire type is provided by the compressibility of the tires themselves. Gross variations are provided for by a pneumatic cylinder.

Figure 9:
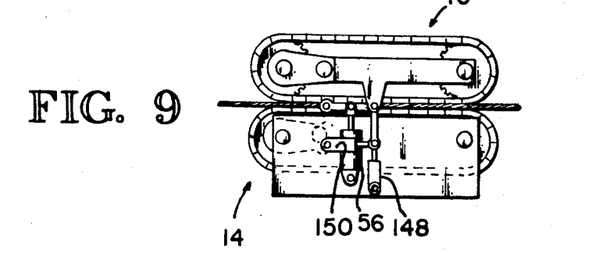
FIG. 9 is a schematic view illustrating use of shock mitigating devices on a cable tension machine.

FIG. 9 schematically illustrates a shock mitigating device useful in this invention. The shock mitigating device comprises shock absorbers 148 and 150 to absorb forces along the longitudinal axis or vertical axis. The shock absorbers act as dampers against movement of the upper track assembly in either the vertical or longitudinal direction. The substantially orthogonal positioning of the shock absorbers 148 and 150 relative to one another provides directional orientation.

We claim:

1. A cable tension machine to pay out or to haul in cable, comprising:
    (a) upper and lower track assemblies positioned atop one another and capable of applying a tensioning force to the cable which passes between the tracks, each track assembly having;
        (i) a frame;
        (ii) an endless track belt capable of moving around the frame to haul in or to pay out cable;
        (iii) a track belt suspension semirigidly attached to the frame and capable of accepting minor variations in cable dimensions, wherein the suspension of one track assembly is aligned with the corresponding suspension of the other track assembly to define a cable contact surface between the track belts of the two assemblies; and
        (iv) means for driving the track belt mounted to each frame;
    (b) a housing to hold both track assemblies in spaced relationship (1) allowing vertical raising of the upper track assembly relative to the lower track assembly through a pivotable lift point and (2) allowing cable to be threaded between the track belts from one side of the machine; and
    (c) a loading device acting on the upper track assembly through the lift point, to allow compensation between the track assemblies for gross variations in cable dimensions and to allow input of the desired tensioning force upon the cable,
wherein
    each track belt suspension includes:
        an elongated suspension unit; and
        means connecting the suspension unit to the frame allowing floating of the suspension unit relative to the frame while allowing transfer of torsional and longitudinal forces on the suspension unit into the frame;
wherein
    each suspension unit includes:
        a plurality of roller pairs sets, each roller set having spaced rollers on shafts, the rollers held apart a predetermined distance by bushing roller supports attached to the shafts on both ends of the rollers;
        rigid connecting links for rigidly connecting adjacent shafts between neighboring roller sets, forming an elongated assembly having two ends; and
        means for positioning each assembly relative to the frame so that the assembly floats and provides the ability of the machine to accept minor variations in cable dimensions between the tracks assemblies; and
wherein the suspension unit further includes an arcuate end roller arm means attached to each end of the assembly for articulating with respect to the assembly while imparting an anticipatory movement and load to the first roller of the assembly, for preparing the assembly to receive a cable of varied cable dimension.

2. A cable tension machine to pay out or to haul in cable, comprising:
    (a) upper and lower track assemblies positioned atop one another and capable of applying a tensioning force to the cable which passes between the tracks, each track assembly having:
        (i) a frame;
        (ii) an endless track belt capable of moving around the frame to haul in or to pay out cable;
        (iii) a track belt suspension semirigidly attached to the frame and capable of accepting minor variations in cable dimension, wherein the suspension of one track assembly is aligned with the corresponding suspension of the other track assembly to define a cable contact surface between the track belts of the two track assemblies; and
        (iv) means for driving the track belt mounted to each frame;
    (b) a housing to hold both track assemblies in spaced relationship (1) allowing vertical raising of the upper track assembly relative to the lower track assembly through a pivotable lift point and (2) allowing cable to be threaded between the track belts from one side of the machine; and
    (c) a loading device acting on the upper track assembly through the lift point, to allow compensation between the track assemblies for gross variations in cable dimensions and to allow input of the desired tensioning force upon the cable,
wherein the upper track assembly is balanced about the lift point so that the center of gravity of the upper track assembly is substantially in a transverse vertical plane that passes through the lift point, ensuring that the machine is better able to exert a more substantially uniform squeeze force over the cable contact surface.

3. The machine of claim 2, further comprising means for centralizing the cable along the longitudinal centerline of the lower track assembly.

4. The machine of claim 2, wherein the loading device comprises a connecting arm pivotably connected at one end to the lift point and at the other end to the frame of the lower track assembly and means operatively associated with the connecting arm to raise or to lower the upper track assembly vertically with respect to the lower track assembly by pivoting the connecting arm.

5. The machine of claim 2, wherein each track belt suspension includes:
(a) an elongated suspension unit; and
(b) means connecting the suspension unit to the frame allowing floating of the suspension unit relative to the frame while allowing transfer of torsional and longitudinal forces on the suspension unit into the frame.

6. The machine of claim 5, wherein each suspension unit includes:
(a) a plurality of roller pairs sets, each roller set having spaced rollers on shafts, the rollers held apart a predetermined distance by bushing roller supports attached to the shafts on both ends of the rollers;
(b) rigid connecting links for rigidly connecting adjacent shafts between neighboring roller sets, forming an elongated assembly having two ends; and
(c) means for positioning each assembly relative to the frame so that the assembly floats and provides the ability of the machine to accept minor variations in cable dimensions between the tracks assemblies.

7. The machine of claim 5, wherein the suspension unit includes:
(a) a plurality of roller sets, each roller set having spaced rollers held apart a predetermined distance by bushing roller supports attached to roller shafts on both ends of the rollers; and
(b) rigid connecting links for connecting adjacent roller shafts between neighboring rollers sets into an elongated assembly having two ends; and
(c) means for positioning the assembly relative to the frame so that the assembly floats and provides the ability of the machine to accept minor variations in cable dimensions between the track assemblies.

8. The machine of claim 6, wherein the means for positioning each assembly includes at least one pneumatic spring attaching the assembly to the frame.

9. The machine of claim 6, wherein each roller set has two rollers, where four rollers in two adjacent roller pairs are connected through the bushing roller supports to a suspension plate and wherein each suspension plate is connected to one pneumatic spring.

10. The machine of claim 9, wherein the suspension unit includes twelve spaced rollers in three sets of four rollers.

11. The machine of claim 2, wherein the lift point is positioned substantially on a horizontal transverse axis which passes through the upper surface of the cable to be tensioned by the machine.

12. The machine of claim 2, further comprising a shock mitigating device connected to the housing.

13. The cable tension machine of claim 2, wherein the lift point lies in a horizontal transverse axis which bisects the cable contact surface.

14. A suspension for a cable tension machine comprising:
(a) at least three roller sets, each roller set having at least two rollers mounted on spaced roller shafts held apart a predetermined distance by bushing roller supports on both ends of the roller shafts; and
(b) rigid connecting links for rigidly connecting adjacent roller shafts between neighboring roller sets into an elongated assembly having two ends wherein the assembly is capable of limited articulation along the length of the assembly,
further including arcuate end roller arm means attached to each end of the assembly, for articulating with respect to the assembly while imparting an anticipatory load and movement to the first roller of the assembly, thereby preparing the assembly to receive a cable of varied cable dimension.

15. A suspension for a cable tension machine comprising:
(a) at least three roller sets, each roller set having at least two rollers mounted on spaced roller shafts held apart a predetermined distance by bushing roller supports on both ends of the roller shafts; and
(b) rigid connecting links for rigidly connecting adjacent roller shafts between neighboring roller sets into an elongated assembly having two ends wherein the assembly is capable of limited articulation along the length of the assembly,
wherein each bushing roller support includes a yoke roller section connected to the rollers, an intermediate elastomeric section connection to the yoke roller section to allow limited vertical and shear movement, a connecting plate portion connected to the intermediate elastomeric section.

16. The suspension of claim 15, wherein roller pairs of the assembly are connected through the bushing connecting links to at least one suspension plate.

17. The suspension of claim 14, further comprising:
(a) means for connecting the suspension to a frame of the cable tension machine which allows floating of the suspension relative to the frame while allowing transfer of torsional forces on the suspension into the frame; and
(b) means for connecting the suspension to the frame which allow floating of the suspension relative to the frame while allowing transfer of longitudinal forces on the suspension into the frame.

18. A cable tension machine to pay out or to haul in cable, comprising:
(a) upper and lower track assemblies positioned atop one another and capable of applying a tensioning force to the cable which passes between the tracks, each track assembly having:
(i) a frame;
(ii) an endless track belt capable of moving around the frame to haul in or to pay out cable;
(iii) a track belt suspension semirigidly attached to the frame and capable of accepting minor variations in cable dimensions, wherein the suspension of one track assembly is aligned with the corresponding suspension of the other track assembly to define a cable contact surface between the track belts of the two track assemblies; and
(iv) means for driving the track belt mounted to each frame;
(b) a housing to hold both track assemblies in spaced relationship allowing movement of the upper track assembly relative to the lower track assembly through a pivotable lift point and allowing cable to be threaded between the track belts from one side of the machine; and (c) a loading device acting through the lift point, to allow compensation between the track assemblies for gross variations in cable dimensions and to allow input of the desired tensioning force upon the cable, wherein the upper track assembly is balanced so that the center of gravity of the upper track assembly is substantially in a transverse vertical plane that passes through the lift point, ensuring that the machine is better able to exert a more substantially uniform squeeze force over the cable contact surface.

19. The machine of claim 18 wherein each track belt suspension includes:

(a) an elongated suspension unit; and (b) means connecting the suspension unit to the frame allowing floating of the suspension unit relative to the frame while allowing transfer of torsional and longitudinal forces on the suspension unit into the frame.

20. The machine of claim 18 wherein each suspension unit includes:

(a) a plurality of roller sets, each roller set having spaced rollers held apart a predetermined distance by bushing roller supports on both ends of the rollers;

(b) rigid connecting links for rigidly connecting adjacent rollers between neighboring roller sets into an elongated assembly having two ends; and (c) means for positioning the assembly relative to the frame so that the assembly floats and provides the ability of the machine to accept minor variations in cable dimensions between the tracks assemblies.

21. The machine of claim 19 wherein each track belt suspension includes:

(a) a plurality of roller sets, each roller set having spaced rollers held apart a predetermined distance by bushing roller supports on both ends of the rollers;

(b) rigid connecting links for rigidly connecting adjacent rollers between neighboring roller sets into an elongated assembly having two ends; and (c) means for positioning the assembly relative to the frame so that the assembly floats and provides the ability of the machine to accept minor variations in cable dimensions between the tracks assemblies.

22. The machine of claim 18 wherein the lift point is positioned substantially on a horizontal transverse axis which passes through the upper surface of the cable to be tensioned by the machine.

23. The machine of claim 20 wherein each suspension unit further includes arcuate end roller arm means attached to each end of the assembly for articulating with respect to the assembly while impacting an anticipatory movement and load to the first roller of the assembly to prepare the assembly to receive a cable of varied cable dimension.

24. A cable tension machine to pay out or to haul in cable, comprising:

(a) upper and lower assemblies positioned atop one another and capable of applying a tensioning force to the cable which passes between the assemblies, said assemblies defining a cable contact surface between them;

(b) a housing to hold both assemblies in spaced relationship allowing vertical raising of the upper assembly relative to the lower assembly through a pivotable lift point and allowing the cable to be threaded between the assemblies from one side of the machine; and (c) a loading device acting on the upper assembly through the lift point, to allow compensation between the assemblies for gross variations in cable dimensions and to allow input of a desired tensioning force upon the cable, wherein the upper assembly is balanced about the lift point so that the center of gravity of the upper assembly is substantially in a transverse vertical plane that passes through the lift point, ensuring that the machine is better able to exert a more substantially uniform squeeze force over the cable contact surface.

25. The machine of claim 24 wherein the lift point is positioned substantially on a horizontal transverse axis which passes through the upper surface of the cable to be tensioned by the machine.

26. The machine of claim 24 wherein the lift point lies on a horizontal transverse axis which bisects the cable contact surface.

27. The machine of claim 25 wherein the lift point lies on a horizontal transverse axis which bisects the cable contact surface.

* * * * *